(12) United States Patent
Beresnev et al.

(10) Patent No.: US 10,222,627 B2
(45) Date of Patent: Mar. 5, 2019

(54) DISPOSING APERTURE-TRUNCATED RADIATION OF DIVERGENT BEAM IN FIBER OPTIC COLLIMATORS AND ARRAYS

(71) Applicant: U.S. Army Research Laboratory ATTN: RDRL-LOC-I, Washington, DC (US)

(72) Inventors: Leonid A. Beresnev, Columbia, MD (US); Anthony R. Valenzuela, Baltimore, MD (US); Chatt C. Williamson, Mt. Airy, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 15/464,382

(22) Filed: Mar. 21, 2017

(65) Prior Publication Data

US 2018/0275418 A1    Sep. 27, 2018

(51) Int. Cl.
| | |
|---|---|
| G02B 27/30 | (2006.01) |
| G02B 3/00 | (2006.01) |
| G02B 7/00 | (2006.01) |
| G02B 9/00 | (2006.01) |
| G02B 11/00 | (2006.01) |
| G02B 13/00 | (2006.01) |
| G02B 15/00 | (2006.01) |
| G02B 17/00 | (2006.01) |
| G02B 25/00 | (2006.01) |
| G02B 27/09 | (2006.01) |
| G02B 6/26 | (2006.01) |
| F41H 13/00 | (2006.01) |

(52) U.S. Cl.
CPC ......... *G02B 27/30* (2013.01); *F41H 13/0062* (2013.01); *G02B 6/262* (2013.01); *G02B 27/0927* (2013.01); *G02B 27/0961* (2013.01); *G02B 27/0977* (2013.01)

(58) Field of Classification Search
CPC .... G02B 6/0045; G02B 6/001; G02B 6/0036; G02B 6/0038; G02B 6/0041; G02B 6/0043; G02B 6/005; G02B 6/0053; G02B 6/0055; G02B 6/0061; G02B 6/0065
USPC ........ 359/641, 642, 643, 656, 290–292, 298
See application file for complete search history.

(56) References Cited

U.S. PATENT DOCUMENTS

2005/0174425 A1\*  8/2005  Harris ................ G02B 21/0028
                                                                    348/45

\* cited by examiner

*Primary Examiner* — Brandi Thomas
(74) *Attorney, Agent, or Firm* — Alan I. Kalb

(57) ABSTRACT

An optics system includes at least one emitting fiber tip that transmits a divergent beam. The divergent beam includes a global maximum intensify of radiation centered with an output optical axis. The divergent beam includes central beams for collimating and periphery beams for disposing. The periphery beams include parasitic radiation of the divergent beam. The optics system includes at least one collimating lens having an output size, output shape, and output optical axis centered thereto and configured to redirect the central beams to a target and redirect the periphery beams into free-space; and at least one redirecting element positioned in between the at least one emitting fiber tip and the at least one collimating lens. The redirecting element includes a first area having an interior size and interior shape to transmit the central beams, and at least one second area outside of the first area to transmit the periphery beams.

20 Claims, 8 Drawing Sheets

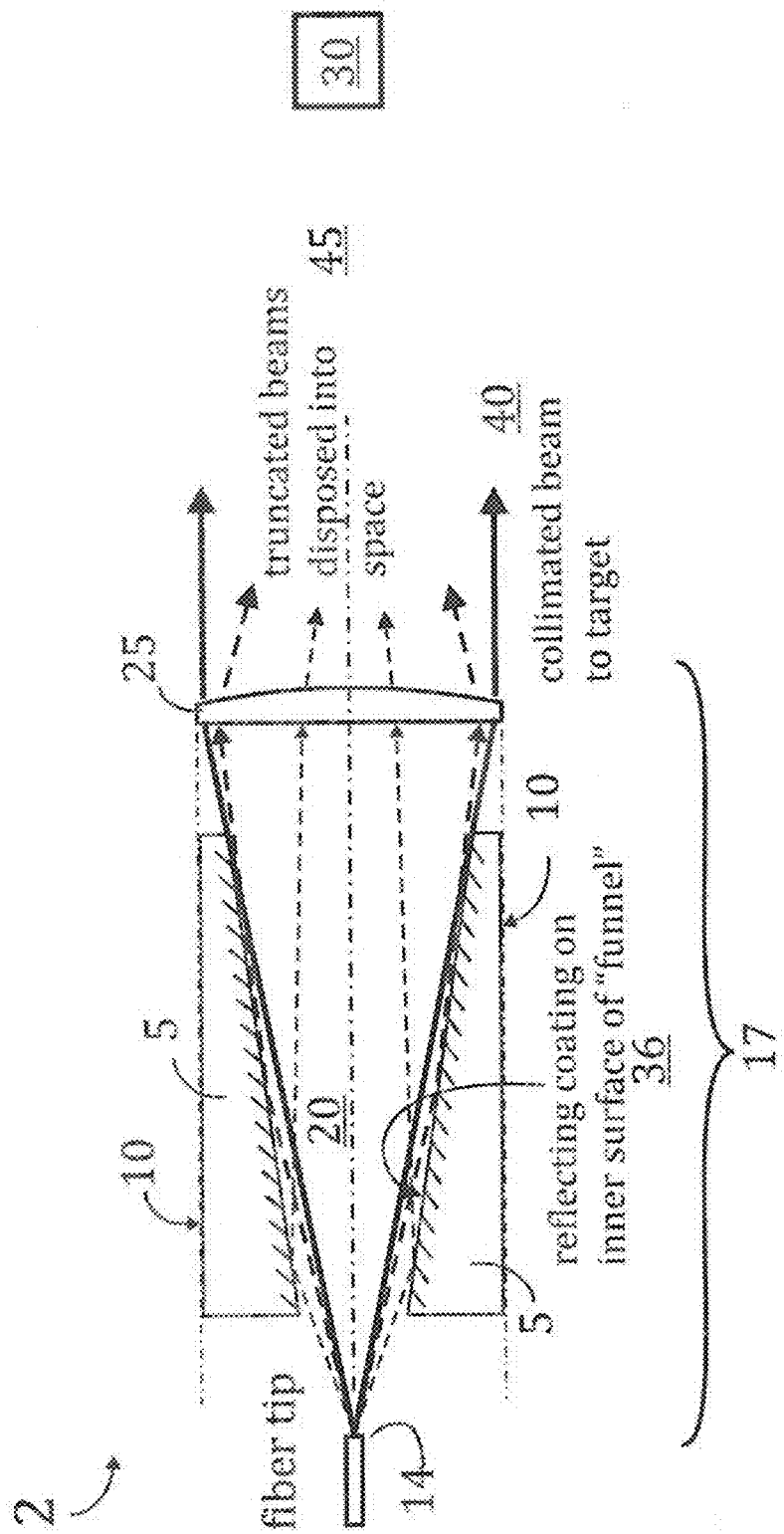

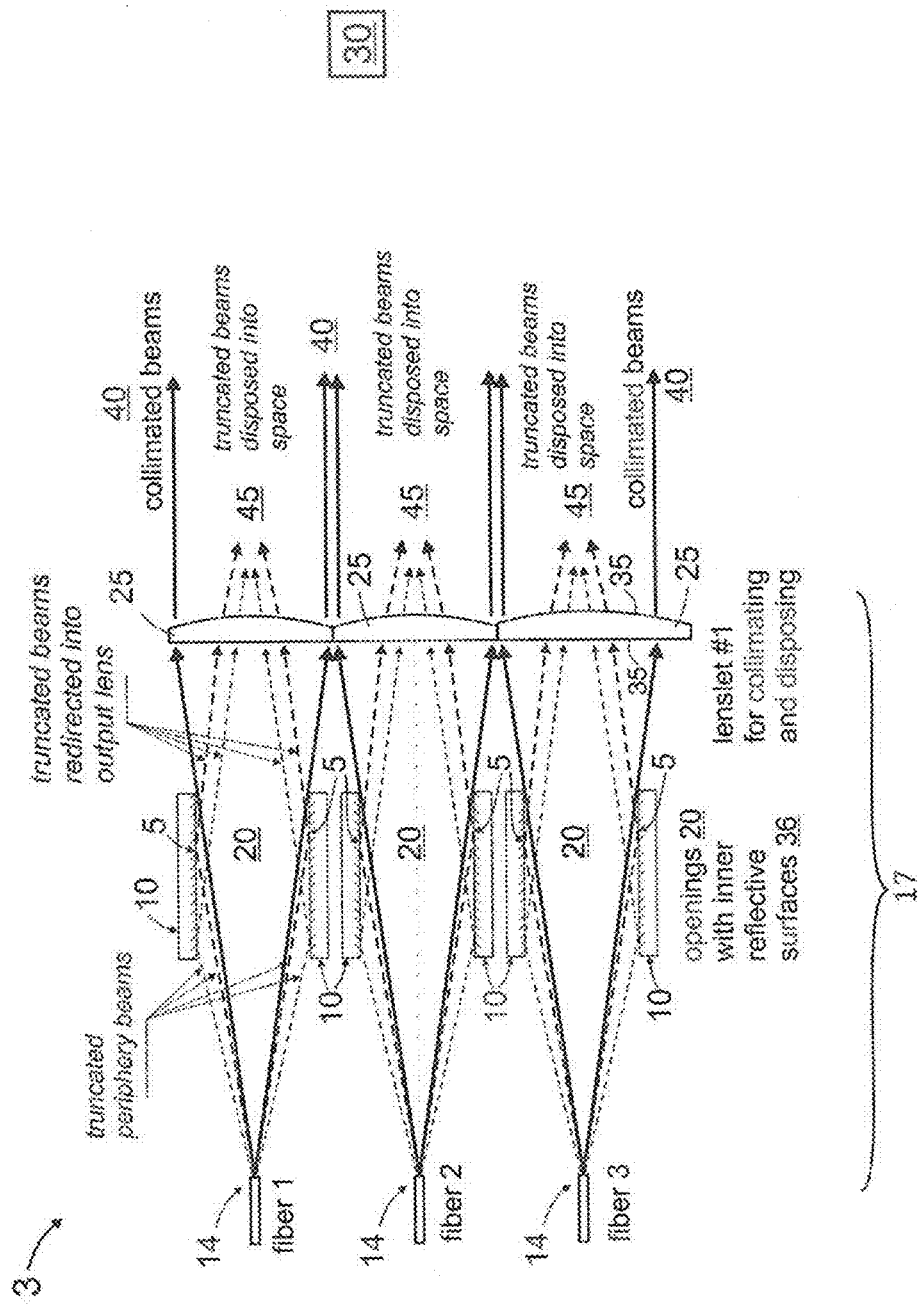

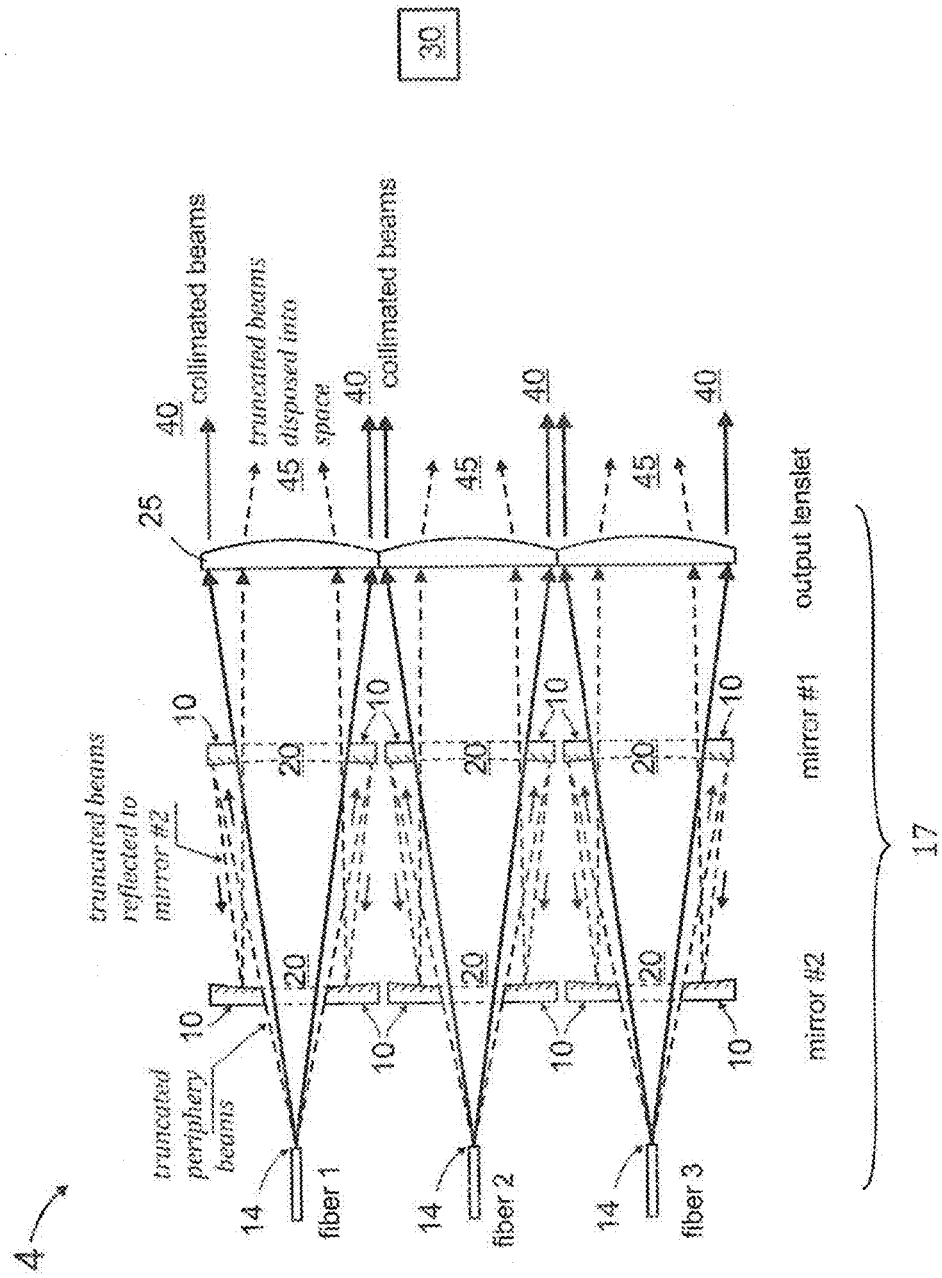

US 10,222,627 B2

DISPOSING APERTURE-TRUNCATED RADIATION OF DIVERGENT BEAM IN FIBER OPTIC COLLIMATORS AND ARRAYS

GOVERNMENT INTEREST

The embodiments herein may be manufactured, used, and/or licensed by or for the United States Government without the payment of royalties thereon.

BACKGROUND

Technical Field

The embodiments herein generally relate to optics, and more particularly to optical collimators.

Description of the Related Art

High Energy Laser (HEL) transmitters using electrical power may have a remarkable niche in a military soldier's arsenal owing to: a) extremely precise target selection without collateral damage; b) delivery of damaging energy at the speed of light; c) easy scalability of damaging factor using a relatively small laser energy focused into very small spot; d) the virtually unlimited number of very cheap shots. There is an applicability of HEL directed energy systems in shooting at light targets., such as, UAVs, mortars, small boats, and missiles. However, the demonstrated apparatus is bulky and heavy, and requires a heavy-weight carrier, such as a truck or ship.

It is a challenge to miniaturize the entire HEL system for military tactical use (over short distances of 1-3 km) to a level of Size Weight and Power (SWaP) sufficiently small to be carried by small trucks like a Humvee, or even as a man-carried device.

The following issues should be considered for miniaturization of an HEL system: 1) Maximum efficiency of conversion of electrical power to optical radiation. 2) Heat management: a) during the conversion of wall outlet (battery) electric power into laser radiation, and b) parasitic radiation management within the transmitter. 3) High quality of the laser beam to allow focusing energy onto the target with the smallest (diffraction limited) spot size. 4) Maximizing the fraction of laser power directed toward the target (minimizing the parasitic losses). 5) Mitigation of beam wander and degradation caused by propagation through turbulent atmospheres and platform jitter. The above-mentioned issues 2b), 3), 4) and 5) are directly related to the transmitter utilizing the high-quality laser radiation (monochromaticity, coherence, power, etc.) created by modem lasers or laser amplifiers.

Solid state lasers (SSL) have very high wall-plug efficiency exceeding 60%, but SSL tend to have poor beam quality. After improvement of beam quality for effective focusing on the target the ultimate wall-plug SSL efficiency drops to less than 25%. The rest of the power (>75%) is mostly transformed to parasitic heat inside the laser source, and extensive resources are necessary to dissipate this heat (heavy chillers, cooling fluids through pumping diodes, etc.). The increase of output optical apertures for improvement of beam focusing is accompanied with an increase of anisoplanatic contribution of high-aperture optics and requires extra apparatus; e.g., adaptive optics with inevitable size, weight and power (SWaP) increase.

The fiber lasers are considered as the most advanced laser sources owing to very high wall-plug efficiency reaching 40% and almost ideal beam quality, M2<1.1. However, the increase of power of fiber laser beam with conservation of high quality is restricted with non-linear effects in single-mode fibers; e.g., SBS (Stimulated Brillouin Scattering). The use of multi-mode fibers for increase of power radiation, above 10 kW leads to loss of beam quality and to the necessity of increasing the size of focusing mirrors, addition of adaptive optics with increase of SWaP, and with slowing down the speed of targeting.

The practical way to scale the power to 100 kW or above is combining multiple fiber lasers each with modest power and high beam quality. The weaponry level can be achieved by combining tens of fiber lasers with power 1-2 kW each. Different methods of laser combination have been explored by the conventional solutions. The conformal array of fiber laser collimators (sub-apertures) is among the most suitable for mobile applications.

The size of the diffraction limited spot, $W_f$, focused on a target is an important criterion of collimator performance; hence, the lens should have a large diameter to provide a smaller spot. For high-power fiber laser radiation emitted by a single mode fiber, the divergence angle of the beam is usually very small and the "beam angle" containing the "Gaussian power" (86.5% of full power) can be as small as 4°. As used herein, the divergent beam is referred to as a "Gaussian beam", owing to that in most cases the approximation of intensity distribution of the beam emitted, from fiber tip can be close enough to a Gaussian distribution. The "Gaussian" approximation allows one to calculate simply the parameters of the optical system based on fiber optics with sufficiently good accuracy for the following practical fabrication of such a system. With the increase of lens diameter d the focal length F should be also increased, or m additional negative lens should be placed between the fiber tip and output lens. Both approaches require either the increase of length or complexity of the collimator.

Generally, for high performance of high-power fiber laser collimators and especially for arrays of such collimators the "Gaussian fill factor" (i.e., the ratio of the diameter of the output lens to the Gaussian beam diameter) and "lenslet fill factor" (i.e., the ratio of the diameter of the output lens to the distance between adjacent fiber tips) have relatively small range for acceptable variations. The best performance of an array requires a high density of fiber collimators (sub-apertures) with ideally 100% lens fill factor, and significant truncation of the Gaussian beams emitted by fiber tips. The accepted truncation should be no less than 5% even with a 100% fill factor of the output lens assembly in case of coherent beam combining (CBC). Tins truncated radiation may carry very high power IkW or higher even for array of seven sub-apertures, each carrying for instance 1.5 kW or more. Standard "interception-dissipation-cooling" approaches to this parasitic radiation requires the extensive cooling of array inner structure, which is not consistent with development of compact and mobile laser transmitters.

SUMMARY

In view of the foregoing, an embodiment herein provides an optics system comprising at least one emitting fiber tip configured to transmit a divergent beam, wherein divergent beam may comprise a global maximum intensity of radiation centered with an output optical axis, wherein the divergent beam may comprise central beams for collimating and periphery beams for disposing, and wherein the periphery beams comprise parasitic radiation of the divergent beam. The optics system further comprises at least one collimating lens comprising an output size, output shape, and output optical axis centered thereto and configured to redirect the central beams to a target and redirect the periphery beams into free-space; and at least one redirecting element positioned in between the at least one emitting fiber tip arid the at least one collimating lens, wherein the at least one redirecting element comprises a first area comprising an interior size and interior shape to transmit the central beams; and at least one second area outside of the first area to transmit the periphery beams. The at least one redirecting element may comprise any of at least one lens and at least one mirror. The first area may comprise any of an opening and a flat window in the at least one lens, and the at least one second area may comprise a portion of the at least one lens. The first area may comprise an opening in the at least one mirror, and wherein the at least one second area may comprise reflective coating on a portion of the at least one mirror. The first area may be positioned in a substantially central portion of the at least one redirecting element. The interior size and the interior shape of the first area may be dimensioned and configured to proportionally align with the output size and the output shape of the at least one collimating lens. The first area may be dimensioned and configured to maximize a power density of the central beams in a focal plane of the target. The at least one collimating lens and the at least one redirecting element may form a collimator. The optics system may further comprise a plurality of collimators arranged in a collimator array. The divergent beam may comprise any of a Gaussian beam and a combination of Bessel beams, or combination of other beams having the global maximum intensity of radiation centered with the output optical axis of the at least one collimating lens.

Another embodiment provides a method comprising transmitting a divergent beam comprising a global maximum intensity of radiation centered with an output optical axis, wherein the divergent beam may comprise central beams for collimating and periphery beams for disposing, and wherein the periphery beams comprise parasitic radiation of the divergent beam; positioning at least one redirecting element comprising a first area, and at least one second area outside of the first area, the first area comprising an interior size and interior shape to transmit the central beams, and the at least one second area outside of the first, area to transmit the periphery beams; transmitting the central beams through the first area; transmitting the periphery beams through the second area; redirecting, through at least one collimating lens, the central beams to a target; and redirecting, through the at least one collimating lens, the periphery beams into free-space. The at least one redirecting element may comprise any of at least one lens and at least one mirror. The first area may comprise any of an opening and a flat window in the at least one lens, and wherein the at least one second area may comprise a portion of the at least one lens. The first area may comprise an opening in the at least one mirror, and wherein the at least one second area may comprise reflective coating on a portion of the at least one mirror. The first area may be positioned in a substantially central portion of the at least one redirecting element. The at least one collimating lens may comprise an output size, output shape, and output optical axis centered thereto and may be configured to redirect the central beams to the target and redirect the periphery beams into free-space. The first area may be dimensioned and configured to proportionally align with a size and shape of the at least one collimating lens. The interior size and the interior shape of the first area maybe dimensioned and configured to proportionally align with the output size and the output shape of the at least one collimating lens. The first area may be dimensioned and configured to maximize a power density of the central beams in a focal plane of the target. The at least, one collimating lens and the at least one redirecting element may form a collimator. The method may further comprise arranging a plurality of collimators in a collimator array. The divergent beam may comprise any of a Gaussian beam and a combination of Bessel beams, or combination of other beams having the global maximum intensify of radiation centered with the output optical axis of the at least-one collimating lens.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing fern the spirit thereof, and the embodiments herein include all such modifications.

BRIEF DESCRIPTION OF THE DRAWINGS

The embodiments herein will be better understood from the following detailed description with reference to the drawings, in which:

FIG. 3A is a schematic diagram illustrating a funnel with reflecting surfaces that re-direct periphery beam tails into an output lens according to the embodiments herein;

FIG. 3B is a schematic diagram illustrating cylinders with inner reflecting surfaces that re-direct periphery beam tails into output lens, with the distal edges of the cylinders being fitted to the shape of the output lens according to the embodiments herein;

FIG. 3C is a schematic diagram illustrating a combination of "holey" mirrors that are re-directing the periphery areas of Gaussian beams into output lenses according to the embodiments herein;

DETAILED DESCRIPTION

Figure 1:
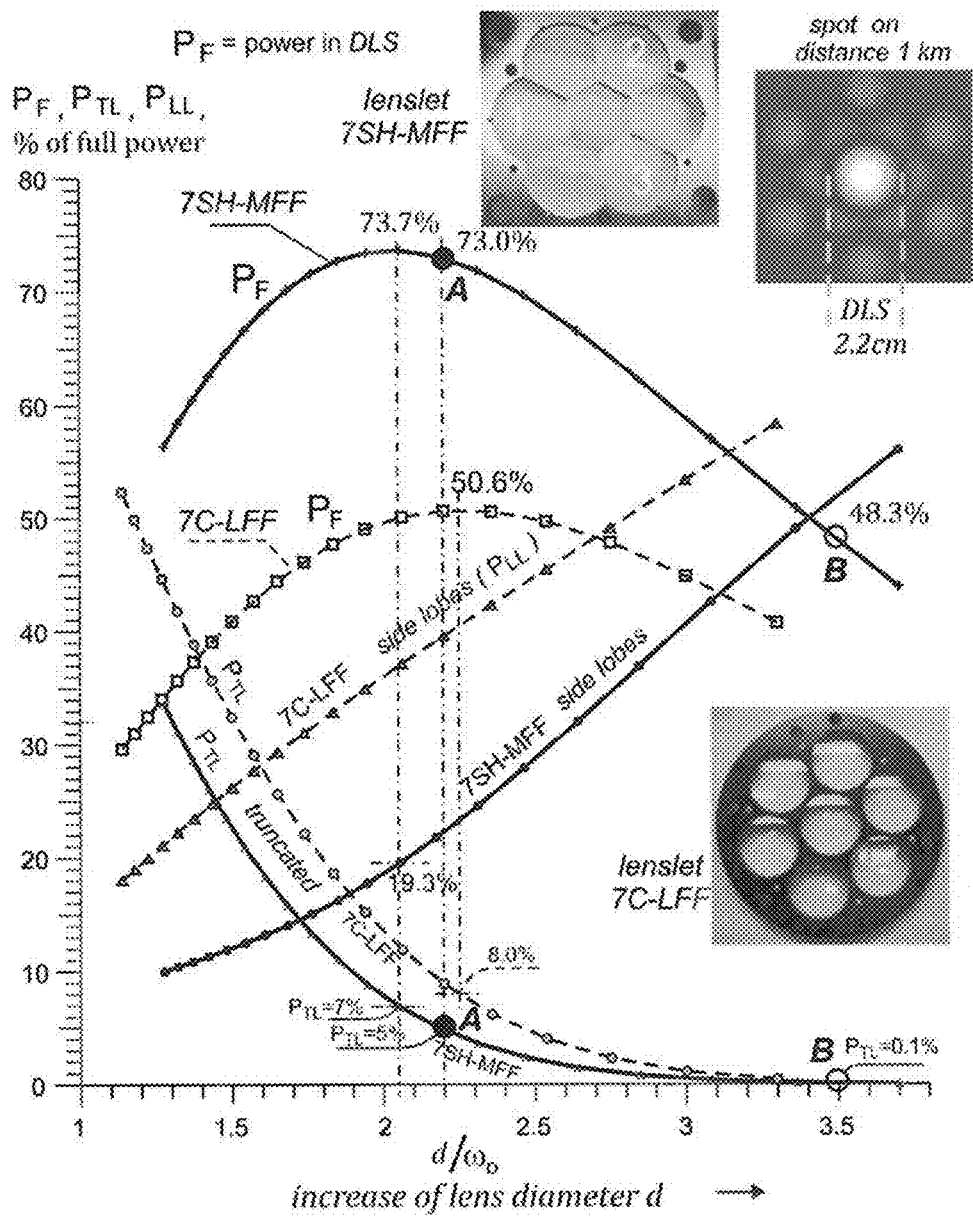
FIG. 1 illustrates a graph showing performance curves of coherent beam combining for two arrays with seven sub-apertures according to the embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide an optical collimator an array of such collimators, wherein the truncated beam tails with parasitic radiation $P_{TL}$ are not intercepted and dissipated within the array, but instead are re-directed into output lenslet. Moreover, no cooling of the array is necessary if the total emitted power will exceed 99.9% and only less than 0.1% of full power will remain inside of the array. For this re-directing, the refracting or reflecting elements are placed between the emitting fiber tips and the output lenses. Referring now to the drawings, and more particularly to FIGS. 1 through 4, where similar reference characters denote corresponding features consistently throughout the figures, there are shown preferred embodiments.

The embodiments herein provide a system and method for disposing of the parasitic radiation of divergent Gaussian beams in a compact fiber optic collimator. Due to the restricted aperture of the output lens, dictated with requirements to compactness of an array and performance ($P_F$) of the focusing of the radiation from the array on the target in coherent beam combining (CBC) mode as shown in FIG. 1, the parasitic (truncated by output aperture) fraction of beam power ($P_{TL}$) can be up to 10% of full power and inner cooling is usually used to handle the power of kW level. The parasitic radiation of periphery areas of the Gaussian beam is redirected into the same output lens using the reflecting or refracting elements placed in between the emitting fiber tip and collimating lens. Again, while the divergent beam is referred to herein as a "Gaussian beam", the embodiments herein may be applicable to any divergent beam having a global maximum (e.g., such as a Lorentzian shape or-combination of Bessel functions describing the actual divergent beam emitted from the fiber tip).

According to the embodiments herein, the parasitic radiation of the periphery areas of the Gaussian beam are disposed of without sacrifice to the maximum diffraction limited power $P_F$, in a diffraction limited spot (DLS), for an array with coherent beam combining of seven sub-apertures. The power, $P_F$, in the DLS will be more than 73%, as shown in FIG. 1. According to calculations accomplished for a 100% fill factor output lens assembly composed from specially shaped lenses, the maximum $P_F$ corresponds to the diameter of the center (hexagonal) lens d which is slightly larger than diameter of Gaussian beam $2\omega_o$, ($d/2\omega_o \sim 2.05$). The truncated power $P_{TL}$ of periphery areas of a Gaussian beam for a full array is expected on the order of 7% ($\sim$1000 W if each collimator is carrying 2 kW). A small decrease on the order of 7-8% ($d/2\omega_o \sim 2.2$), point A in FIG. 1, of the focal length of the output lenses insignificantly reduces (from 73.7% to 73.0%) the power $P_F$ in the central-lobe but the truncated power decreases to 5% ($\sim$700 W). This power (which is too high for a compact transmitter) will be disposed of into space to avoid heating of the array.

Figure 2A:
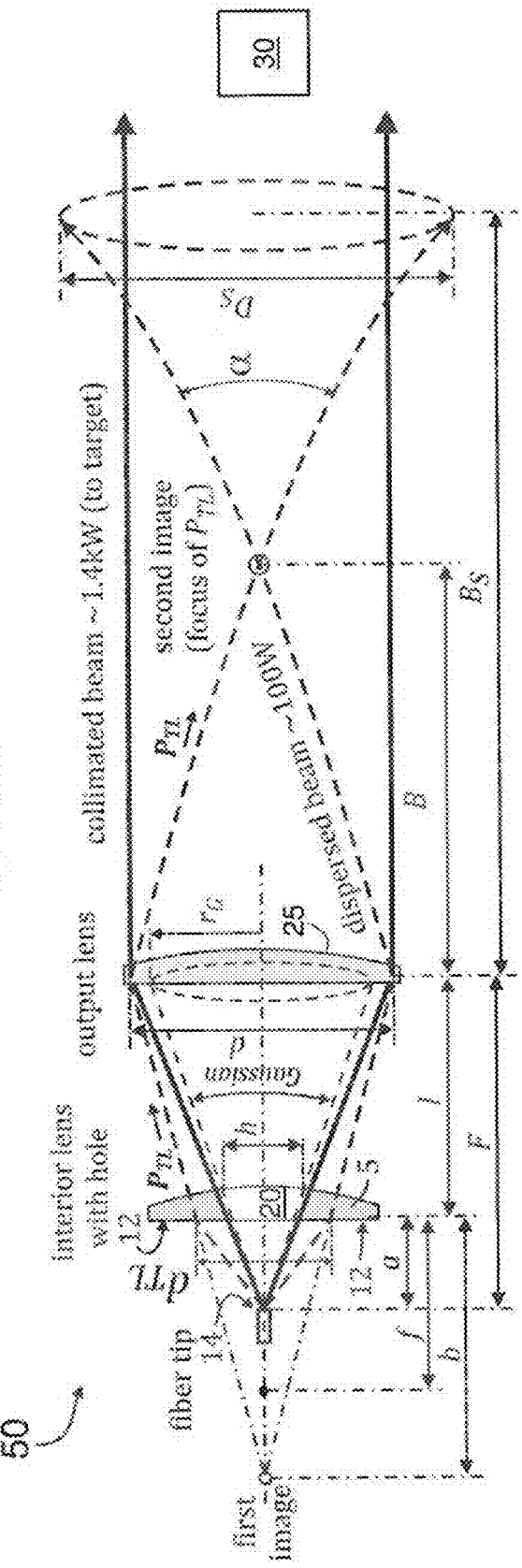
FIG. 2A is a schematic diagram illustrating a collimator according to the embodiments herein.

A collimator 50 comprising a redirecting interior lens 12 is shown in FIG. 2A. The interior lens 12 has a hole 20 with a shape exactly matching the shape of the output collimating lens 25 having the restricted aperture according to the above-mentioned requirements to compactness and the performance of the array. Dimensions h of the hole 20 are proportional to a×d/F, where a is the distance between the fiber tip 14 and the interior lens 12. In. FIG. 2A, 1 is the distance between the output lens 25 and the interior lens 12, B is the distance between the output lens 25 and beam tail focus, and $B_S$ is the distance to the location of the divergent beam tail expanding to diameter $D_S$. The safe distance is defined as truncated radiation departing distance $B_S$ where $D_S$ is approximately equal to the diameter of the conformal aperture D. The hole 20 in the interior lens 12 has dimension h to match 100% filling of the output lens 25. In FIG. 2A, $r_G$, is the spot radius on the output lens 25 illuminated by a Gaussian beam with divergence angle $2\omega_0$, and $d_{TL}$ is a diameter of fraction $P_{TL}$ of the divergent beam redirected by the interior lens 12 into aperture d of the output lens 25.

Figure 2B:
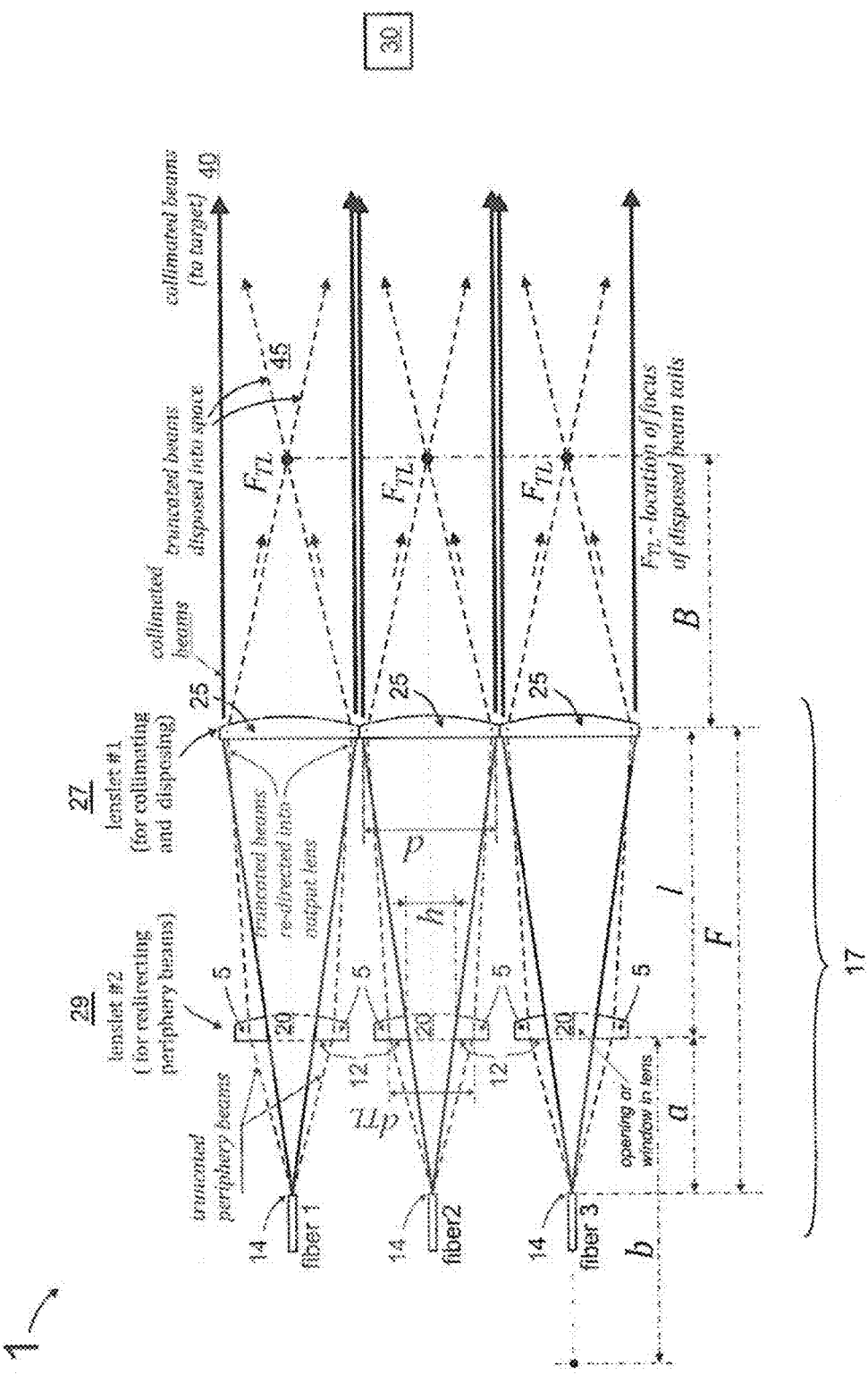
FIG. 2B is a schematic diagram illustrating a densely packed array with interior "holey" lenses which re-direct the periphery areas of Gaussian beams into the output lenses according to the embodiments herein.

Re-directing elements interior lenses 12 with openings/holes 20 are provided in accordance with the embodiments herein (refractive case), as shown in the system 1 of FIG. 2B; and "holey" mirrors 10 of different configurations (reflecting case), as shown in the systems 2, 3, 4 of FIGS. 3A through 3D, respectively. The "double lens" system 1 is shown in FIG. 2B. Inner lenses 12 have openings 20 comprising a height h which transmit the main portion of Gaussian beams achieving the maximum performance in beam combining, for instance more than 70% of full power is delivered into the diffraction limited spot in the case of coherent beam combining, as shown in FIG. 1, $P_F$=73.7% for an amy of seven sub-apertures. In another embodiment, the hole 20 is not a physical opening, but rather a flat window without focusing capabilities, but rather only transmits the central beam.

In all the systems 1, 2, 3, 4, 50 the "holey" re-directing elements (interior lenses 12 or mirrors 10) have an opening 20 in their substantially central area. The most powerful central fraction of the Gaussian beams with 93-95% of the power passes through the openings 20 and fills the output lenses 25 with maximum fill factor (~100%). The areas 5 of the mirrors 10 or lenses 12 outside of the openings 20 change the direction of propagation of periphery beam tails and re-direct them into the output lens 25 of collimator 50 or output lenses 25 of a densely-packed array 17. The areas 5 may comprise a Freshnel lens in one embodiment. The mirrors 10 may comprise a reflecting coating 36 on the inner surfaces of the funnel portion of the mirrors 10.

Thus, the output lenses 25 are part of two optical systems: 1) "collimating" system 27 providing the focusing of a high-power fraction 40 onto the focal plane of the target 30; and 2) the "disposing" system 29 which is re-directing the much smaller power of the periphery beam tails 45 forward into space, along with re-directing the high-power beam.

Figure 3D:
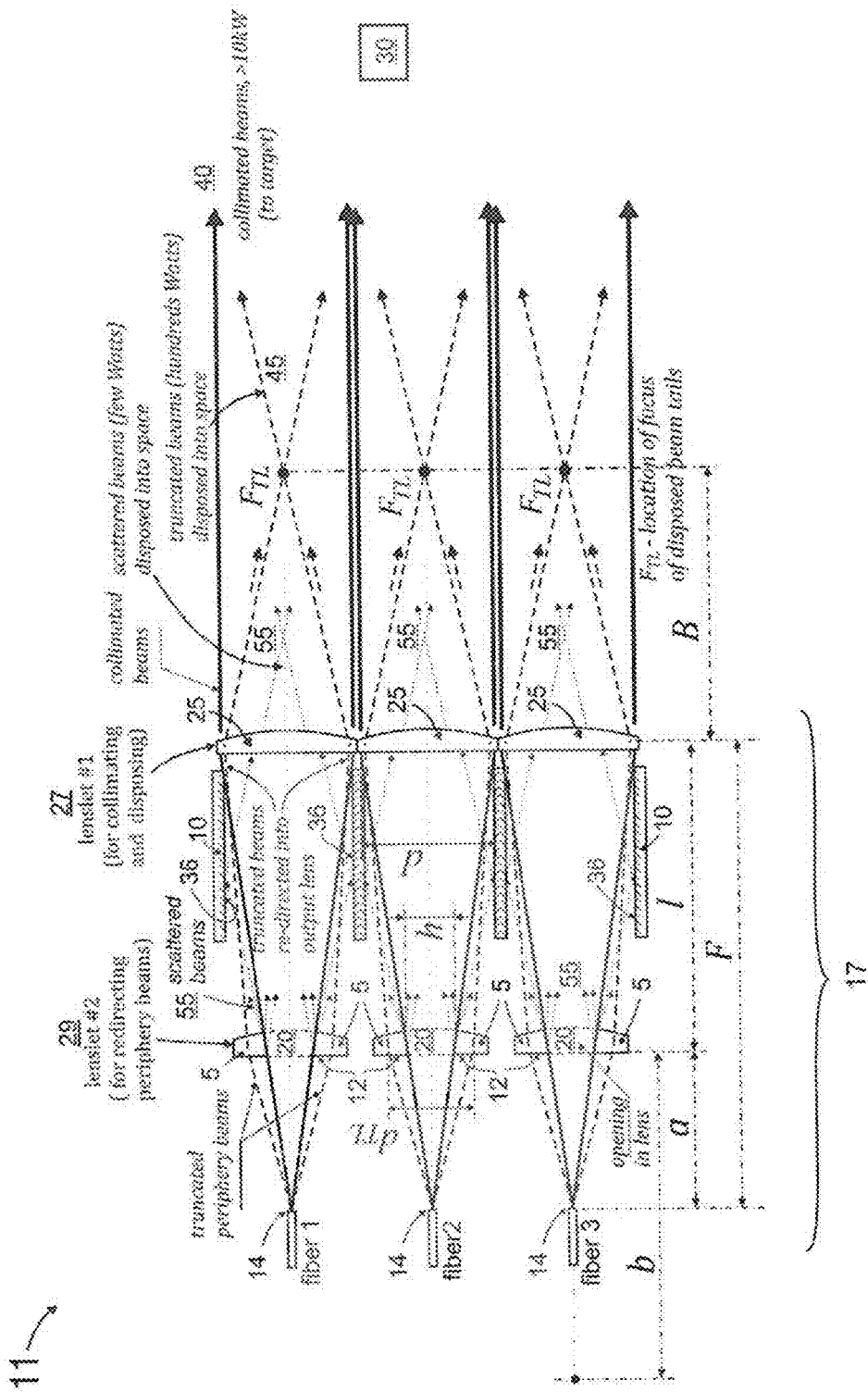
FIG. 3D is a schematic diagram illustrating a system combining refracting and reflecting elements according to the embodiments herein.

In FIGS. 2A and 2B, the collimating system 27 comprises the fiber tips 14, holes 20, and output lenses 25, and the disposing system 29 comprises the fiber tips 14, outer/redirecting areas 5, and output lenses 25. In FIGS. 3A and 3B, the collimating system 27 comprises the fiber tips 14, holes 20, and output lenses 25, and the disposing system 29 comprises the fiber tips 14, reflecting coating 36 on the inner surfaces of the redirecting areas 5, and the output, lenses 25. FIG. 3C is a schematic diagram illustrating a combination of mirrors 10 that are re-directing the periphery areas of Gaussian beams into output lenses 25 according to the embodiments herein. FIG. 3D is a schematic diagram illustrating a system 11 combining refracting and reflecting elements 5, 10, respectively, according to the embodiments herein. Here, the mirrors 10 are placed before output lenses 25, and the reflecting surfaces 36 redirect the randomly scattered beams 55 from imperfections of edges of holes 20 in interior lenses 5. The power of randomly scattered fraction 55 from each channel may have only few Watts, but for a large (e.g., >10) number of channels it can be tens of Watts. An additional rib structure (not shown) may be positioned behind the output lenses 25, which protects the edges of output lenses 25 from any scattered beams; redirecting them into output lens 25 and disposing them into space.

The radiation from the disposing system 29 is not focused on the target 30, but rather focused at a distance away in free-space (e.g., some meters) from the array 17. A highly transparent anti-reflection coating (ARC) 35 with reflection R<0.05% configured on both sides of output, lenses 25 can provide for trapping scattering of approximately 0.1% of the full power inside the array 17. This means, each channel with 1-1.5 kW may contribute only 1-2 W of trapped/scattered radiation inside the array 17. The interior lenses 12 and mirrors 10 require much less optical quality with modest ARC with reflection <0.1% (inner lenses 12) or modest reflection (R>97% in the case of mirrors 10) owing to the smaller power in the beam tails 45, which is 15-20 times smaller than the power of central fraction (main power beam) 40. The required quality of the inner lens 12 does not need to focus all the radiation m any precise direction, but merely somewhere onto the output lens 25 which can then send it "anywhere" outside of array 17 along with main power beam 40. However, the inner lenses 12 and mirrors 10 disperse the parasitic radiation in a controlled direction, preferably in the direction of the target 30.

Table 1 provides example values of the parameters describes with respect to FIG. 2A. In the example values, the focal length of the output lens 25 is F=350 mm and the diameter is 43 mm. The focal length of the interior lens 12 is f=200 mm. The Gaussian beam fill factor, $d_{TL}/\omega_o$=3.5, is selected to produce redirected beam tails with a truncated faction, $P_{TL}$=0.1%.

TABLE 1

Parameters of the collimator 50 of FIG. 2A

| | | | | | |
|---|---|---|---|---|---|
| a, distance to fiber facet (cm) | 8 | 9 | 10 | 11 | 12 |
| l, distance between lenses (cm) | 27 | 26 | 25 | 24 | 23 |
| b, distance to first image (cm) | −13.3 | −16.4 | −20 | −24.4 | −30 |
| h, size of hole in interior lens (mm) | 6.4 | 7.2 | 8.0 | 8.8 | |
| diameter of $P_{TL}$ spot on output lens (mm) | 29.7 | 28.5 | 27.6 | | |
| B, focusing distance of $P_{TL}$ from array (m) | 2.65 | 2.014 | 1.58 | 1.26 | 1.03 |
| $D_S$, spot size of $P_{TL}$ at safe distance $B_S$ = 10 m (cm) | 8.2 | 11.2 | 14.8 | 20.2 | |
| Diameter of $P_{TL}$ spot at 1 km (m) | 11 | 14 | 17.5 | 22.6 | |

Table 2 provides an example of the dimension, focal length, size of opening(s), and location of all optical elements that are presented for system 1. It is noted that the numeric values given in Table 2 are merely provided as an example, and the embodiments herein are not restricted to the particular values given in Table 2. The parameters of the parasitic radiation outside of array are also presented. These parameters, are consistent with the basic requirements formulated below: (1) The disposed radiation should be focused on distance of at least some distance (e.g., some meters) from the array. (2) The divergence of the parasitic beam should be small enough. For instance, at a distance of 10 m the parasitic spot should not exceed a diameter; e.g., 15 cm to avoid the collateral illumination of personal or equipment near the HEL beam, propagating to the target 30, (3) The openings 20 in the inner lenses 12 should be not too small, because inner edges of these holes truncate a kW class bean. Consequently, the size of the opening 20 directly defines the location of the inner lenses 12 relative to the emitting fiber tip 14.

The focal length F of the output lens 25 used for the calculations in Table 2 is selected as 35 cm, the size of the central hexagonal lens of output lens assembly is d=29 mm, the pitch of fibers in the array is also 29 mm. Two options for truncation losses $P_{TL}$ by outer diameter of interior lens $d_{TL}$ are considered: 1) very small, $P_{TL}$<<0.1%, $d/\omega_o$=4.2; and 2) $P_{TL}$=0.1%, acceptable for a HEL transmitter without cooling; see data on curve $P_{TL}$ for $d/\omega_o$=3.5 in FIG. 1. In this case, the same plot in FIG. 1 is used for the selection of diameter of $d_{TL}$ of the area on the interior lens, which redirects the $P_{TL}$ fraction into the aperture of the output lens with restricted size d. As it is seen from Table 2, the large value of $d_{TL}/\omega_o$3.5 allows the system to reach high transmission >>99.9% but is accompanied with an increase of distance a between the fiber tip and interior lens and a non-desirable decrease of distance B to the focus of the image.

In Table 2:
f—focal length of inner lenses is variable: 12.5 cm, 15 cm, 17.5 cm, and 20 cm.
Column 1, Index/Identifier
Column 2, B—distance between array (output lenses) and focal plane of disposed beams.
Column 3, 1—distance between output lens and interior (inner) lens.
Column 4, h—size of hole in central (hexagonal) lens.
Column 5—diameter of spot of parasitic radiation on output lens for two truncations $P_{TL}$<<0.1 % and $P_{TL}$=0 0.1 %.
Column 6, a—distance between inner lenses and fiber tip.
Column 7, b—distance between, inner lens and imaginary image of fiber tip (first image).
Columns 8, 9—sizes of image of fiber core with diameter 20 μm.
Column 10—diameter of spot formed with parasitic beam at a distance 10 m from the array.
Column 11—diameter of spot formed with parasitic beam as a distance 1 km from array.

TABLE 2

Details of example parameters for system 1 of FIG. 2B

| 1 | 2<br>B (focus from array) (m) | 3<br>Distance l between lenses, (cm) | 4<br>Hole h in inner lens (mm) | 5<br>$P_{TL}$ spot diameter on output (mm) | 6<br>Distance to fiber facet, a (cm) | 7<br>Distance to first image, b (cm) | 8<br>First image height (mm) | 9<br>Second image height (mm) | 10<br>$P_{TL}$ spot diameter on 10 m (cm) | 11<br>$P_{TL}$ Spot diameter on 1 km (m) |
|---|---|---|---|---|---|---|---|---|---|---|
| | f = 12.5 cm, $d/\omega_o$ = 4.2, $P_{TL}$ << 0.1% | | | | | | | | | |
| 1 | 1.73 m | 28 | 5.6 | 27.0 mm | 7 cm | −15.9 cm | 45 mm | 178 mm | 13 Cm | 15.6 m |
| 2 | 1.21 m | 27 | 6.4 | 26.0 mm | 8 | −22.2 | 55 mm | 137 mm | 18.9 cm | 21.5 m |

TABLE 2-continued

Details of example parameters for system 1 of FIG. 2B

| | 2<br>B (focus from array)<br>(m) | 3<br>Distance 1 between lenses,<br>(cm) | 4<br>Hole h in inner lens<br>(mm) | 5<br>$P_{TL}$ spot diameter on output<br>(mm) | 6<br>Distance to fiber facet, a<br>(cm) | 7<br>Distance to first image, b<br>(cm) | 8<br>First image height<br>(mm) | 9<br>Second image height<br>(mm) | 10<br>$P_{TL}$ spot diameter on 10 m<br>(cm) | 11<br>$P_{TL}$ Spot diameter on 1 km<br>(m) |
|---|---|---|---|---|---|---|---|---|---|---|
| 3 | 0.88 m | 26 | 7.2 | 23.9 mm | 9 | −32.1 | 71 mm | 108 mm | 25 cm | 27 m |
| 4 | 0.66 m | 25 | 8 | 22.6 mm | 10 | −50 | 100 | 88 mm | 32 cm | 34.5 m |
| | | | | f = 15 cm, $d/\omega_o$ = 4.2, $P_{TL}$ << 0.1% | | | | | | |
| 5 | 1.69 m | 27 | 6.4 | 30.4 mm | 8 cm | −17.1 cm | 40 mm | 164 mm | 15 cm | 18 m |
| 6 | 1.257 m | 26 | 7.2 | 28.5 mm | 9 | −22.5 | 50 mm | 129 mm | 19.8 cm | 22.7 m |
| 7 | 0.96 m | 25 | 8 | 26.9 mm | 10 | −30 | 60 mm | 105 mm | 25.3 Cm | 28 m |
| | | | | f = 17.5 mm, $d/\omega_o$ = 4.2, $P_{TL}$ << 0.1%, | | | | | | |
| 8 | 1.64 m | 26 | 7.2 | 31.8 mm | 9 cm | −18.5 cm | 41 mm | 151 mm | 16.2 cm | 19 m |
| 9 | 1.27 m | 25 | 8.0 | 30.4 mm | 10 | −23.3 | 46 mm | 122 mm | 20.9 cm | 28 m |
| 10 | 1.08 | 24 | 8.8 | 29.3 mm | 11 | −29.6 | 53 mm | 101 mm | 24.2 cm | 27 m |
| 11 | 0.82 | 23 | | | 12 | −38.1 cm | 63 mm | 85 mm | | |
| | | | | f = 17.5 mm, $d/\omega_o$ = 3.5, $P_{TL}$ = 0.1%, | | | | | | |
| 12 | 1.64 m | 26 | 7.2 | 26.5 mm | 9 cm | −18.5 cm | 41 mm | 151 mm | 13.5 cm | 16 m |
| 13 | 1.27 m | 25 | 8.0 | 25.4 mm | 10 | −23.3 | 46 mm | 122 mm | 17.5 cm | 20 m |
| 14 | 1.08 | 24 | 8.8 | 24.4 mm | 11 | −29.6 | 53 mm | 101 mm | 20.2 cm | 22.6 m |
| | | | | f = 20 mm, $d/\omega_o$ = 3.5, $P_{TL}$ = 0.1%, | | | | | | |
| 15 | 2.65 m | 27 | 6.4 | 29.7 mm | 8 cm | −13.3 Cm | 33 mm | 219 mm | 8.2 cm | 11 m |
| 16 | 2.014 m | 26 | 7.2 | 28.5 mm | 9 | −16.4 | 36 mm | 172 mm | 11.2 cm | 14 m |
| 17 | 1.58 m | 25 | 8.0 | 27.6 mm | 10 | −20 | 40 mm | 140 mm | 14.8 cm | 17.5 m |
| 18 | 1.26 | 24 | 8.8 | | 11 | −24.4 | 44 mm | 116 mm | 20.2 cm | 22.6 m |
| 19 | 1.03 | 23 | | | 12 | −30 | 50 mm | 97 mm | | |

Most of listed nineteen examples in Table 2 allow passing of all parasitic radiation through the output lens 25. This radiation forms the spot on output aperture less than 30 mm. Due to small fraction 5-7% of full power of any selected collimator (50-100 W at full power 1-1.5 kW) this additional power is not a significant extra radiation load on the output lens 25.

Some examples require the close location of inner lenses 12 to the fiber tip 14 with significantly reduced size of opening, h=5.6 mm (row 1); h=6.4 mm (rows 2, 5, 15), h=7.2 mm (rows 3, 6, 8, 12, 16). Smaller focal lengths f require the closer location a of re-directing lens to the fiber tip 14 to provide the similar distance B to focused parasitic spot $F_{TL}$, shown in FIG. 2B, and acceptable divergence, with diameter less than 15 cm of parasitic spot on distance 10 m (Column 10). Such lenses require significantly reduced size of inner holes 6.4 mm or less, hence, higher accuracy is needed during the fabrication of the opening. Among the most suitable solutions are examples listed in rows 12 and 17. They provide relatively large distance B to focused parasitic spot (>1.5 m) and small enough parasitic spot on distance 10 m (<15 cm). They require relatively large opening 7.2-8 mm, with reduced requirements to precision of fabrication of such openings. The focal lengths f=17.5 cm and f=20 cm provide higher stability of output parameters of parasitic beam against variations of inner lens location and opening tolerances.

The embodiments herein provide a fiber laser collimator 50 and array 17 configured to transmit approximately 100% of full power from the fiber tip 14 despite a restricted output lens aperture. The collimator 50 emits a high-power beam (1-3 kW level) and array 17 may transmit 7-21 kW into free-space and does not require cooling because all the parasitic radiation from the periphery areas of the Gaussian beam(s) is re-directed into the outer space through the same output collimating lens 25 which is collimating the main central portion of the beam 40. The reflecting or refracting elements 10, 12 are placed in between the fiber tip 14 and the collimating (output) lens 25. The elements 10, 12 have central openings 20, which pass the central portion of the Gaussian beam which fills the full aperture of the output-lens 25. The outer area 5 of the elements 10, 12 re-directs the truncated periphery areas of the divergent beam 45 into the same output lens 25. Approximately 100% of power of the beam leaves the collimator 50 through the output lens 25. The radiation is not trapped inside of the collimator 50 and no parasitic heating of the inner elements 10, 12 of the collimator 50 takes place despite the small size of the collimator 50. The high compactness and small weight of the collimator 50 allows one to develop a portable array 17 of densely packed collimators with the maximum efficiency of CBC on the remote target or receiver 30 for directed energy applications, for free-space optical communication, laser machining, etc.

According to the embodiments herein the optimum truncation of the Gaussian beams in ease of CBC allows one to have the maximum fraction of full power, $P_F$, of all fiber tips 4 to be focused into a diffraction-limited spot on the target 30 that is many times smaller than from a single collimator output (sub-aperture). For instance, for an array 17 of seven such collimators, the power fraction 73.7% can be concentrated into the spot of a size of 2 cm in diameter at a distance of 1 km, if the output lenses 25 form the 100% fill factor; Conversely, the conventional lenslet (circular lenses in frame) allows one to focus only 50.4%. The spot size from a single sub-aperture is more than 6 cm.

The embodiments herein provide a system 1, 2, 3, 4 and method of disposing the radiation of periphery areas of the Gaussian beam that does not require one to intercept and dissipate truncated radiation inside of a collimator 50 or inside an array 17 of collimators. Simple high reflectivity mirrors 10 and lenses 12 with an anti-reflective coating with reflection R<0.1% allow one to build the high-power transmitter without cooling, but rather dispersing the parasitic radiation into free-space. In the case of fiber arrays 17, the summed power delivered to the target 30 by a compact transmitter can exceed tens of kW in a diffraction limited spot, whereas the parasitic radiation of kW level can be disposed outside the array 17 along with the direction to the target 30. The significant resources are saved which otherwise are necessary for cooling the array 17 and/or to compensate thermally induced aberrations and misalignment of array elements. Owing to the absence of cooling systems, the transmitter with the method of disposing the parasitic radiation provided by the embodiments herein allows one to develop compact weaponry level transmitters for directed energy programs.

Figure 4:
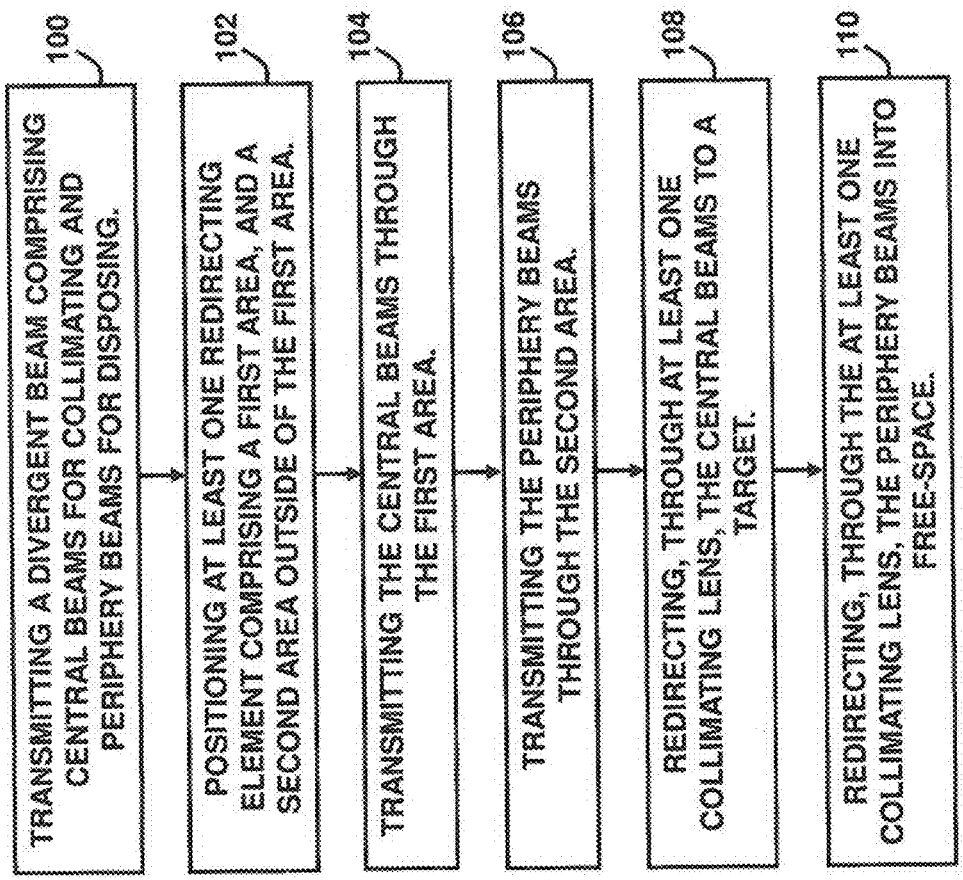
FIG. 4 is a flow diagram illustrating a method according to an embodiment herein.

FIG. 4, with reference to FIGS. 1 through 3D, is a flow diagram illustrating a method according to an embodiment herein. The method comprises transmitting (100) a divergent beam comprising a global maximum intensity of radiation centered with an output optical axis, wherein the divergent beam may comprise central beams 40 for collimating and periphery beams 45 for disposing, and wherein the periphery beams 45 comprise parasitic radiation of the divergent beam; positioning (102) at least one redirecting element 10, 12 comprising a first area 20, and at least one second area 5 outside of the first area 20, the first area 20 comprising an interior size and interior shape to transmit the central beams 40, and the at least one second area 5 outside of the first area 20 to transmit the periphery beams 45; transmitting (104) the central beams 40 through the first area 20; transmitting (106) the periphery beams 45 through the second area 5; redirecting (108), through at least one collimating lens 25, the central beams 40; to a target 30; and redirecting (110), through the at least one collimating lens 25, the periphery beams 45 into free-space. The at least one redirecting element 10, 12 may comprise any of at least one lens 12 and at least one mirror 10. The first area 20 may comprise any of an opening and a flat window in the at least one lens 12, and wherein the at least one second area 5 may comprise a portion of the at least one lens 12. The first area 20 may comprise an opening in the at least one mirror 10, and wherein the at least one second area 5 may comprise reflective coating on a portion of the at least one mirror 10. The first area. 20 may be positioned in a substantially central portion of the at least one redirecting element 10, 12.

The at least one collimating lens 25 may comprise an output size, output shape, and output optical axis centered thereto and configured to redirect the central beams 40 to the target 30 and redirect the periphery beams 45 into free-space. The first area 20 may be dimensioned and configured to proportionally align with a size and shape of the at least one collimating lens 25. The interior size and the interior shape of the first area 20 may be dimensional and configured to proportionally align with the output size and the output shape of the at least one collimating lens 25. The first area 20 may be dimensioned and configured to maximize a power density of the central beams 40 in a focal plane of the target 30. The at least one collimating lens 25 and the at least one redirecting element 10, 12 may form a collimator 50. The method may further comprise arranging a plurality of collimators in a collimator array 17. The divergent beam may comprise any of a Gaussian beam and a combination of Bessel beams, or combination of other beams having the global maximum intensity of radiation centered with the output optical axis of the at least one collimating lens 25.

The foregoing description of the specific embodiments will so fully reveal the general nature of the embodiments herein that others can, by applying current knowledge, readily modify and/or adapt for various applications such specific embodiments without departing from the generic concept and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An optics system comprising:
   at least one emitting fiber tip configured to transmit a divergent beam, wherein said divergent beam comprises a global maximum intensity of radiation centered with an output optical axis, wherein said divergent beam comprises central beams for collimating and periphery beams for disposing, and wherein said periphery beams comprise parasitic radiation of said divergent beam;
   at least one collimating lens comprising an output size, output shape, and output optical axis centered thereto and configured to redirect said central beams to a target and redirect said periphery beams into free-space; and
   at least one redirecting element positioned in between said at least one emitting fiber tip and said at least one collimating lens, wherein said at least one redirecting element comprises:
      a first area comprising an interior size and interior shape to transmit said central beams; and
      at least one second area outside of said first area to transmit said periphery beams.

2. The optics system of claim 1, wherein said at least one redirecting element comprises any of at least one lens and at least one mirror.

3. The optics system of claim 2, wherein said first area comprises any of an opening and a flat window in said at least one lens, and wherein said at least one second area comprises a portion of said at least one lens.

4. The optics system of claim 2, wherein said first area comprises an opening in said at least one mirror, and wherein said at least one second area comprises reflective coating on a portion of said at least one mirror.

5. The optics system of claim 1, wherein said first area is positioned in a substantially central portion of said at least one redirecting element.

6. The optics system of claim 1, wherein said interior size and said interior shape of said first area is dimensioned and configured to proportionally align with said output size and said output shape of said at least one collimating lens.

7. The optics system of claim 1, wherein said first area is dimensioned and configured to maximize a power density of said central beams in a focal plane of said target.

8. The optics system of claim 1, wherein said at least one collimating lens and said at least one redirecting element form a collimator.

9. The optics system of claim 8, further comprising a plurality of collimators arranged in a collimator array.

10. The optics system of claim 1, wherein said divergent beam comprises any of a Gaussian beam and a combination of Bessel beams, or combination of other beams having said global maximum intensity of radiation centered with said output optical axis of said at least one collimating lens.

11. A method comprising:
transmitting a divergent beam comprising a global maximum intensity of radiation centered with an output optical axis, wherein said divergent beam comprises central beams for collimating and periphery beams for disposing, and wherein said periphery beams comprise parasitic radiation of said divergent beam;
positioning at least one redirecting element comprising a first area, and at least one second area outside of said first area, said first area comprising an interior size and interior shape to transmit said central beams, and said at least one second area outside of said first area to transmit said periphery beams;
transmitting said central beams through said first area;
transmitting said periphery beams through said second area;
redirecting, through at least one collimating lens, said central beams to a target; and
redirecting, through said at least one collimating lens, said periphery beams into free-space.

12. The method of claim 11, wherein said at least one redirecting element comprises any of at least one lens and at least one mirror.

13. The method of claim 12, wherein said first area comprises any of an opening and a flat window in said at least one lens, and wherein said at least one second area comprises a portion of said at least one lens.

14. The method of claim 12, wherein said first area comprises an opening in said at least one mirror, and wherein said at least one second area comprises reflective coating on a portion of said at least one mirror.

15. The method of claim 11, wherein said first area is positioned in a substantially central portion of said at least one redirecting element.

16. The method of claim 11, wherein said at least one collimating lens comprising an output size, output shape, and output optical axis centered thereto and configured to redirect said central beams to said target and redirect said periphery beams into free-space, wherein said first area is dimensioned and configured to proportionally align with said output size and said output shape of said at least one collimating lens, and wherein said interior size and said interior shape of said first area is dimensioned and configured to proportionally align with said output size and said output shape of said at least one collimating lens.

17. The method of claim 11, wherein said first area is dimensioned and configured to maximize a power density of said central beams in a focal plane of said target.

18. The method of claim 11, wherein said at least one collimating lens and said at least one redirecting element form a collimator.

19. The method of claim 18, further comprising arranging a plurality of collimators in a collimator array.

20. The method of claim 11, wherein said divergent beam comprises any of a Gaussian beam and a combination of Bessel beams, or combination of other beams having said global maximum intensity of radiation centered with said output optical axis of said at least one collimating lens.

* * * * *